United States Patent
Conway

(10) Patent No.: US 10,387,315 B2
(45) Date of Patent: Aug. 20, 2019

(54) REGION MIGRATION CACHE

(71) Applicant: Advanced Micro Devices, Inc., Sunnyvale, CA (US)

(72) Inventor: Patrick N. Conway, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 488 days.

(21) Appl. No.: 15/095,778

(22) Filed: Apr. 11, 2016

(65) Prior Publication Data

US 2017/0212845 A1    Jul. 27, 2017

Related U.S. Application Data

(60) Provisional application No. 62/286,618, filed on Jan. 25, 2016.

(51) Int. Cl.
G06F 3/06 (2006.01)
G06F 12/12 (2016.01)
(Continued)

(52) U.S. Cl.
CPC ........ G06F 12/0833 (2013.01); G06F 3/0611 (2013.01); G06F 3/0647 (2013.01);
(Continued)

(58) Field of Classification Search
CPC ............. G06F 12/0833; G06F 12/122; G06F 12/0802; G06F 12/128; G06F 12/1009;
(Continued)

(56) References Cited

U.S. PATENT DOCUMENTS

2008/0109629 A1* 5/2008 Karamcheti .......... G06F 9/5016
711/170
2009/0216910 A1* 8/2009 Duchesneau ......... G06F 9/5072
709/250

(Continued)

OTHER PUBLICATIONS

Molka et al., Main Memory and Cache Performance of Intgel Sandy Bridge and AMD Bulldozer, Jun. 13, 2014, ACM, MSPC' 14, pp. 2-6. (Year: 2014).*

(Continued)

*Primary Examiner* — Shane D Woolwine
(74) *Attorney, Agent, or Firm* — Zaborin Cave LLP

(57) ABSTRACT

A memory access profiling and region migration technique makes allocation and replacement decisions for periodic migration of most frequently accessed regions of main memory to least frequently accessed regions of a region migration cache, in background operations. The technique improves performance in sparsely-used memory systems by migrating regions of main memory corresponding to the working footprint of main memory to the region migration cache. A method includes profiling a stream of memory accesses to generate an access frequency ranked list of address ranges of main memory and corresponding access frequencies based on memory addresses in the stream of memory accesses. The method includes periodically migrating to a region migration cache contents of a region of main memory selected based on the access frequency ranked list. The method includes storing a memory address range corresponding to the contents of the region migration cache in a tag map.

29 Claims, 5 Drawing Sheets

(51) Int. Cl.
| | | |
|---|---|---|
| *G06F 12/122* | (2016.01) | |
| *G06F 12/128* | (2016.01) | |
| *G06F 12/0802* | (2016.01) | |
| *G06F 12/0831* | (2016.01) | |
| *G06F 12/1009* | (2016.01) | |
| *G06F 12/1027* | (2016.01) | |

(52) U.S. Cl.
CPC .......... *G06F 3/0653* (2013.01); *G06F 3/0685* (2013.01); *G06F 12/0802* (2013.01); *G06F 12/1009* (2013.01); *G06F 12/1027* (2013.01); *G06F 12/122* (2013.01); *G06F 12/128* (2013.01); *G06F 12/12* (2013.01); *G06F 2212/1024* (2013.01); *G06F 2212/621* (2013.01); *G06F 2212/651* (2013.01); *G06F 2212/70* (2013.01)

(58) Field of Classification Search
CPC .... G06F 3/0685; G06F 3/0653; G06F 3/0647; G06F 3/0611; G06F 2212/271; G06F 2212/30; G06F 2212/301651; G06F 2212/621; G06F 2212/68; G06F 12/12; G06F 12/1027; G06F 2212/1024; G06F 2212/70; G06F 2212/651
USPC .................. 711/134, 136, 141, 159, 160, 173
See application file for complete search history.

(56) References Cited

U.S. PATENT DOCUMENTS

| | | |
|---|---|---|
| 2010/0169602 A1 | 7/2010 | Hulbert et al. |
| 2012/0124323 A1 | 5/2012 | Lu et al. |
| 2012/0137075 A1 | 5/2012 | Vorbach |
| 2013/0185475 A1 | 7/2013 | Talagala et al. |
| 2014/0006714 A1* | 1/2014 | Cherukuri ........... G06F 12/0817 711/128 |
| 2015/0169227 A1 | 6/2015 | Dickey |
| 2015/0189039 A1* | 7/2015 | Cheng ................. H04L 67/2842 709/216 |
| 2017/0060434 A1* | 3/2017 | Chang .................. G06F 3/0608 |

OTHER PUBLICATIONS

Ramos, L., et al., "Page Placement in Hybrid Memory Systems," ICS'11, May 31-Jun. 4, 2011, Tuscon, Arizona, ACM, 2011, pp. 85-95.

Conway, P., et al., "Cache Hierarchy and Memory Subsystem of the AMD Opteron Processor," IEEE Micro, Mar./Apr. 2010, pp. 16-29.

Lameter, C., "NUMA (Non-Uniform Memory Access): An Overview," ACM Queue, vol. 11, Issue 7, Aug. 9, 2013, 12 pages.

Mysore, S., et al., "Profiling Over Adaptive Ranges," In Proceedings of the 4th Annual International Symposium on Code Generation and Optimization (CGO), Mar. 2006, pp. 1-12.

U.S. Appl. No. 15/130,793 filed Apr. 15, 2016, entitled "Adaptive Value Range Profiling for Enhanced System Performance," by Inventor Mauricio Bretemitz.

Karakostas, V., et al., "Redundant Memory Mappings for Fast Access to Large Memories," ISCA '15, Jun. 13-17, 2015, ACM, 13 pages.

Lipasti, M., and Shen, J., "Exceeding the Dataflow Limit via Value Prediction," Proceedings of the 29th Annual ACM/IEEE International Symposium on Microarchitecture, Dec. 2-4, 1996, 12 pages.

* cited by examiner

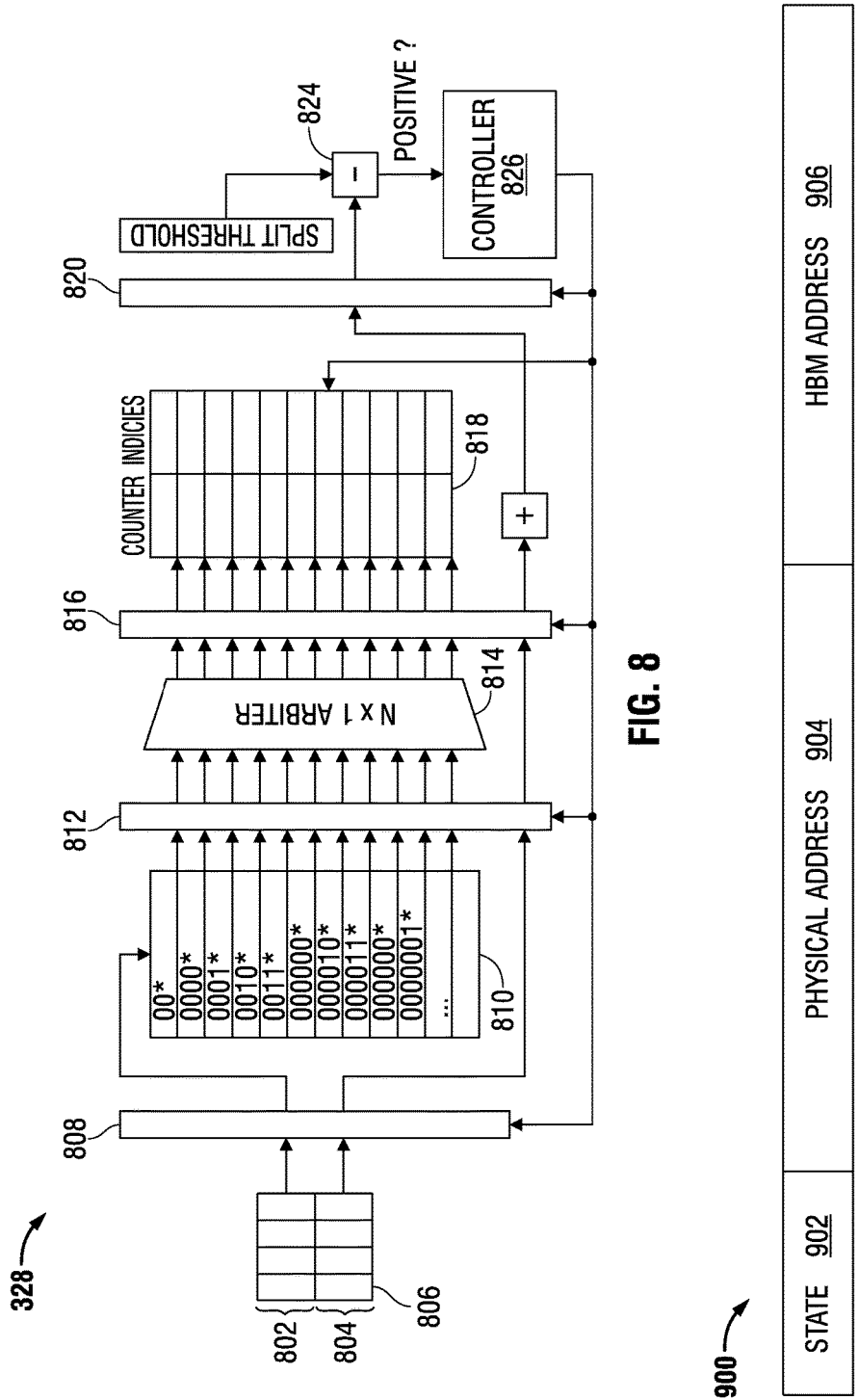

| RANGE | F0 | F1 | F2 | F3 | F<sub>TOTAL</sub> |
|---|---|---|---|---|---|
| RANGE 0 | | | | | |
| RANGE 1 | | | | | |
| RANGE 2 | | | | | |
| RANGE 3 | | | | | |
| ⋮ | ⋮ | ⋮ | ⋮ | ⋮ | ⋮ |
| RANGE N | | | | | |

REGION MIGRATION CACHE

CROSS-REFERENCE TO RELATED APPLICATION(S)

This application claims the benefit under 35 U.S.C. § 119(e) of U.S. Provisional Application No. 62/286,618, filed Jan. 25, 2016, entitled "REGION MIGRATION CACHE" by Patrick N. Conway, et al., which application is hereby incorporated by reference.

BACKGROUND

Field of the Invention

The invention is related to computing systems and more particularly to memory systems of computing systems.

Description of the Related Art

In a typical computing system, a memory system is designed with a goal of low latency experienced by a processor when accessing arbitrary units of data. In general, the memory system design leverages properties known as temporal locality and spatial locality. Temporal locality refers to multiple accesses of specific memory locations within a relatively small time period. Spatial locality refers to accesses of relatively close memory locations within a relatively small time period.

Typically, temporal locality is evaluated in terms of a granularity smaller than that of a next level in a memory hierarchy. For example, a cache captures a repeated access of blocks (e.g., 64 Bytes (B)), which is smaller than the storage granularity of main memory (e.g., 4 Kilobyte (KB) pages). Spatial locality is typically captured by storing quantities of data slightly larger than a requested quantity in order to reduce memory access latency in the event of sequential access. For example, a cache is designed to store 64B blocks, although a processor requests one to eight Bytes at a time. Meanwhile, the cache requests 64B at a time from a memory, which stores pages of 4 KB contiguous portions.

Typical memory migration techniques have the goal of further reducing the latency of memory accesses by moving contents of main memory into page caches of a requesting coherence domain in response to individual memory accesses. In general, those techniques rely on software and require either user interception or introduce substantial overhead during migration. Accordingly, improved memory migration techniques are desired.

SUMMARY OF EMBODIMENTS OF THE INVENTION

In at least one embodiment of the invention, a method includes profiling a stream of memory accesses to generate an access frequency ranked list of address ranges of main memory and corresponding access frequencies based on memory addresses in the stream of memory accesses. The method includes periodically migrating to a region migration cache contents of a region of main memory selected based on the access frequency ranked list. The method includes storing at least one memory address range corresponding to the contents of the region migration cache in a tag map. An address range of the region of main memory having a highest access frequency in the access frequency ranked list may replace a second region in the migration cache having a second address range having a lowest access frequency in the access frequency ranked list.

The profiling may include range adaptive profiling the memory addresses in the stream of memory requests based on a merge threshold and a split threshold. The merge threshold may indicate a minimum access frequency for each address range of the access frequency ranked list. The split threshold may indicate a maximum access frequency for each address range of the access frequency ranked list. The periodically migrating may occur as a background operation and not in response to a particular memory access. The method may include accessing the region migration cache in response to a hit of a memory request in the region migration cache. The method may include accessing main memory in response to a miss of the memory request in the region migration cache. The method may include comparing a memory address of a memory request to each memory address range in the tag map of the region migration cache to determine whether or not contents of memory associated with the memory address are present in the region migration cache.

Periodically migrating may include allocating a region of main memory to the region migration cache based on a corresponding access frequency in the access frequency ranked list. The allocating may include creating a tag map entry including a range corresponding to the region. The allocating may include transferring data from a region of main memory to the region migration cache using direct memory access. The allocating may include while transferring the data, servicing any write memory accesses to the region using the region migration cache and the main memory. The allocating may include while transferring the data, servicing any read memory accesses to the region using the main memory. The periodically migrating may include deallocating a second region of main memory from the region migration cache prior to allocating the region. The deallocating may be based on a corresponding access frequency in the access frequency ranked list. The deallocating may include clearing the tag map entry including a second range corresponding to the second region. The deallocating may include transferring second data from the region migration cache to the second region of main memory using direct memory access in response to a dirty second region state. The deallocating may include, while transferring the second data, servicing any write memory accesses to the second region using the region migration cache and the main memory. The deallocating may include, while transferring the second data, servicing any read memory accesses to the second region using the region migration cache.

In at least one embodiment, an apparatus includes a memory access profiler configured to generate an access frequency ranked list of address ranges of main memory and corresponding access frequencies based on memory addresses in a stream of memory requests. The apparatus includes a region migration cache having a first access time faster than a second access time of the main memory. Contents of a region of main memory are allocated to a region of the region migration cache based on the access frequency ranked list. The apparatus includes a tag map configured to store memory addresses corresponding to the contents of the region migration cache. The region migration cache may be coupled between a last-level cache of a processor and the main memory, outside a coherence domain of the processor.

The apparatus may include a controller configured to periodically initiate transfer of data between main memory and the region migration cache independent of a particular memory access. The transfer may include transferring a region of main memory that has a highest access frequency in the access frequency ranked list to replace a second region in the migration cache having a lowest access frequency in the access frequency ranked list. The transfer may include allocation of a region of main memory to the region migration cache based on a corresponding access frequency in the access frequency ranked list. The controller may be further configured to create a tag map entry including an address range corresponding to the region. The controller may be configured to transfer data from a region of main memory to the region migration cache using the direct memory access. The controller may be configured to service any write memory accesses to the region using the region migration cache and the main memory during the transfer. The controller may be configured to service any read memory accesses to the region using the main memory during the transfer. The controller may be further configured to deallocate a second region of main memory from the region migration cache prior to allocation of the region based on a corresponding access frequency in the access frequency ranked list. The controller is further configured to clear the tag map entry including a second range corresponding to the second region. The controller may be further configured to initiate transfer of second data from the region migration cache to the second region of main memory using direct memory access in response to a dirty second region state. The controller may be further configured to service any write memory accesses to the second region using the region migration cache and the main memory while transferring the second data. The controller may be further configured to service any read memory accesses to the second region using the region migration cache while transferring the second data. The region migration cache may include a high bandwidth memory. The main memory may include non-volatile persistent memory. The region migration cache may use a write back policy that writes only those elements that are changed to the non-volatile persistent memory. The region migration cache may be fully associative.

In at least one embodiment, a method of operating a non-uniform memory access processing system includes profiling, by each processing node of a plurality of processing nodes of the non-uniform memory access system, a corresponding stream of memory requests, to generate a corresponding list of address ranges of main memory of the processing node and corresponding vectors of range access frequency by each processing node of the plurality of processing nodes. The method includes migrating a region of data from a first main memory of a first processing node of the plurality of processing nodes to a second main memory of a second processing node of the plurality of processing nodes. The region is selected based on a first corresponding list of memory address ranges of the first main memory of the first processing node and first corresponding vectors of range access frequency by each processing node. The migrating may include periodically accessing the corresponding list of address ranges of main memory for each processing node of the plurality of processing nodes to select the region of data and the second main memory for the migrating. The second processing node may be a most frequently accessing node of the region of data of the first main memory. The profiling by each processing node may be based on a corresponding merge threshold and a corresponding split threshold. The merge threshold may indicate a minimum access frequency for each address range of the list. The split threshold may indicate a maximum access frequency for each address range of the list. The method may include updating the corresponding list of address ranges of main memory by a processing node of the plurality of processing nodes to span less than an entire address space of main memory of the processing node.

In at least one embodiment of the invention, a non-uniform memory access processing system includes a plurality of processing nodes. Each processing node of the plurality of processing nodes includes a main memory, a processor, and a range profiler configured to generate a corresponding list of address ranges of main memory of the processing node and corresponding vectors of range access frequency by each processing node of the plurality of processing nodes based on a corresponding stream of memory requests to the main memory. At least one processor of the plurality of processing nodes is configured to execute instructions to migrate a region of data from main memory of a first processing node of the plurality of processing nodes to main memory of a second processing node of the plurality of processing nodes based on the corresponding list and corresponding vectors of the first processing node. The range profiler of each processing node may be coupled between a last-level cache of the processing node and the main memory of the processing node, outside a coherence domain of the processing node. The second processing node may be a most frequently accessing node of the region of data of the first main memory. The instructions may be included in an operating system of the non-uniform memory access processing system. The corresponding list and corresponding vectors for each processing node maybe exposed to the operating system. The regions may be portions of pages of memory. The profiler may be configured to profile a subset of the memory address space of the main memory.

BRIEF DESCRIPTION OF THE DRAWINGS

The present invention may be better understood, and its numerous objects, features, and advantages made apparent to those skilled in the art by referencing the accompanying drawings.

FIG. 8 illustrates a functional block diagram of exemplary range adaptive profiler logic consistent with at least one embodiment of the invention.

FIG. 9 illustrates an exemplary storage map of a storage location of an exemplary tag map of a region migration cache consistent with at least one embodiment of the invention.

FIG. 10 illustrates an exemplary ranked list storage of an exemplary range profiler consistent with at least one embodiment of the invention.

The use of the same reference symbols in different drawings indicates similar or identical items.

DETAILED DESCRIPTION

Figure 1:
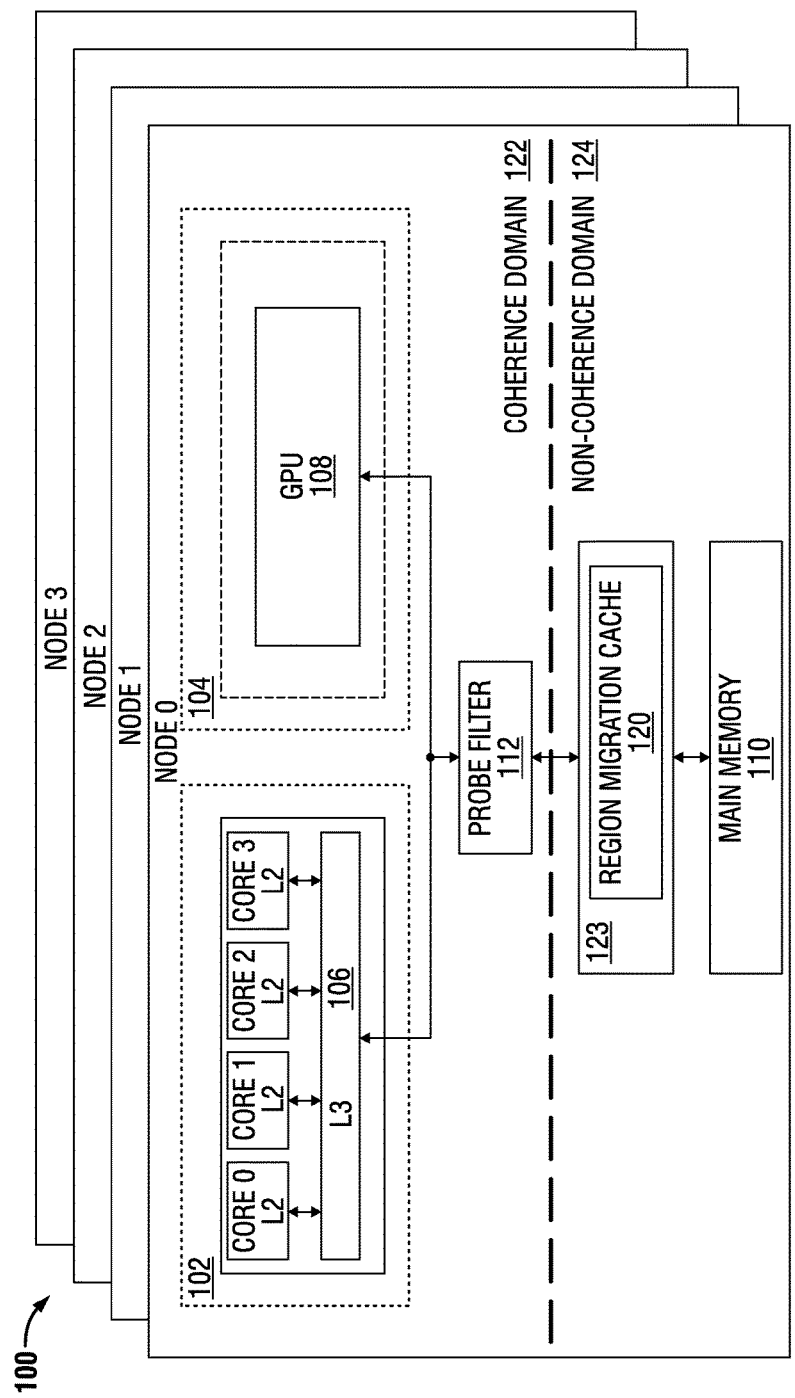
FIG. 1 illustrates a functional block diagram of an exemplary processing system consistent with at least one embodiment of the invention.

Referring to FIG. 1, an exemplary non-uniform memory access processing system (e.g., a server) includes multiple processing nodes (e.g., node 0, node 1, node 2, and node 3), each including multiple processors (e.g., processor 102 including core 0, core 1, core 2, and core 3 and processor 104 including graphics processing unit 108) and a memory system. Each of the nodes can access its own memory within corresponding coherence domain 122 faster than memory in non-coherence domain 124 (e.g., main memory 110) or memory in another node. The processing nodes use interprocessor communication to maintain coherency of a memory image in main memory 110 when more than one cache contains the contents of the same location of main memory 110 of coherence domain 122. A snooping cache coherency policy may be implemented by system 100. In at least one embodiment of system 100, probe filter 112 includes storage for a cache directory of a directory-based cache coherency policy. Probe filter 112 may be implemented in fast static Random Access Memory (RAM) associated with the memory controller (not shown) or by other suitable technique.

Figure 2:
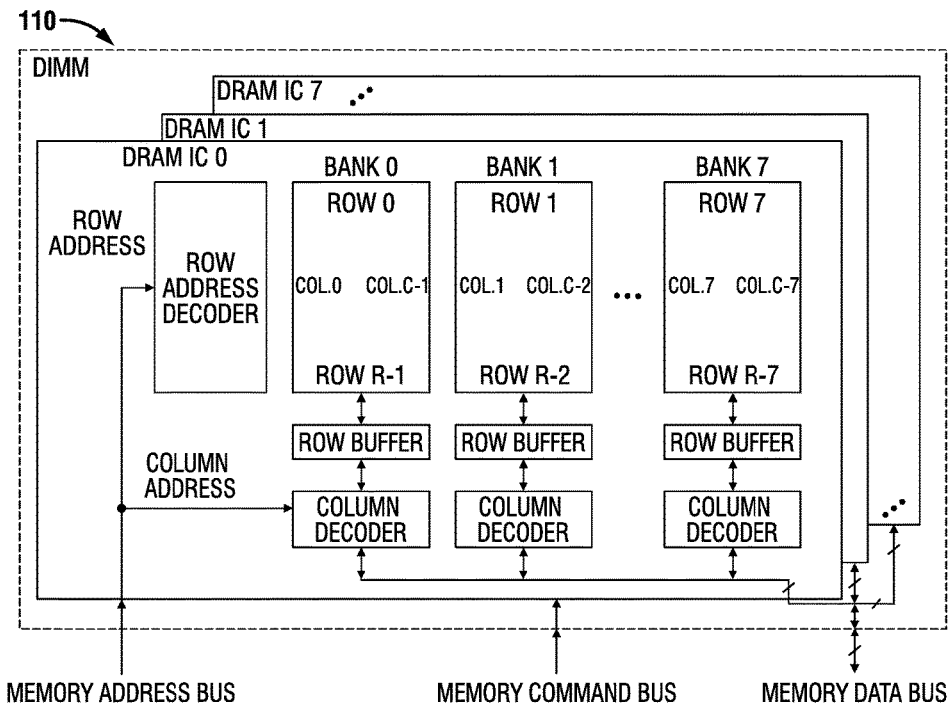
FIG. 2 illustrates a functional block diagram of an exemplary memory system for use with the processing system of FIG. 1.

Referring to FIG. 2, main memory 110 includes one or more memory integrated circuits (e.g., one or more dynamic RAM (DRAM) integrated circuits). In at least one embodiment, the memory system includes multiple memory integrated circuits, which are accessed in parallel (e.g., configured as a dual in-line memory module (DIMM)). Each memory integrated circuit may include a data interface (e.g., 8-bit data interface) that is combined with data interfaces of other memory integrated circuits to form a wider data interface (e.g., 64-bit data interface). Each memory integrated circuit may include multiple independent memory banks, which can be accessed in parallel. Each memory bank may include a two-dimensional array of DRAM cells, including multiple rows and columns. A location of the memory may be accessed using a memory address including bank, row, and column fields. In at least one embodiment of the memory system 110, only one row in a bank may be accessed at a time and the row data may be stored in a row buffer dedicated to that bank. An activate command moves a row of data from the memory array into the row buffer. Once a row is in the row buffer, a read or write command may read/write data from/to the associated memory address. Thus, the latency of a memory command depends on whether or not a corresponding row is in a row buffer of an associated memory bank.

If the contents of a memory address are in the row buffer (i.e., the memory address hits the row buffer), then a memory controller only needs to issue a read or write command to the memory bank, which in an embodiment has a read memory access latency of $t_{CL}$ or write memory access latency of $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which, in an embodiment, has an associated read memory access latency of $t_{RCD}+t_{CL}+t_{RP}$ or write memory access latency of $t_{RCD}+t_{WL}+t_{RP}$, respectively, where $t_{RCD}$ is the required delay time between an active command row address strobe and a column address strobe and $t_{RP}$ is the row precharge latency. Note that the memory architecture of FIG. 2 is exemplary only and the teachings described herein apply to systems including main memory 110 having other memory architectures.

Referring back to FIG. 1, although main memory 110 has huge capacity, in typical operation after filtering of the memory traffic by multiple levels of processor caches, workload behavior results in memory traffic that is sparsely distributed, i.e., a substantial amount of allocated address space is unused during a substantial amount of time, and a substantial number of memory accesses target relatively few, well-defined narrow regions of the memory address space that may occur at widely spaced intervals. Memory sparsity is a common characteristic of typical cloud computing and enterprise computing workloads and may increase with emerging use of high capacity non-volatile RAM.

Memory controller 123 of system 100 includes region migration cache 120, which implements a memory access profiling and region migration technique that makes allocation and replacement decisions for periodic migration of most frequently accessed regions of main memory to least frequently accessed regions of a region migration cache, in background operation of main memory 110. The technique improves memory latency in sparsely-used memory systems by migrating regions of main memory corresponding to the working footprint of main memory to the region migration cache, which is memory having lower latency than main memory 110. As referred to herein, a region of memory is an aligned power-of-two sized section of physical address space in main memory that may be a multiple of pages, each multiple of pages having a predetermined size, or having a size unrelated to predetermined page sizes of conventional memory systems (e.g., predetermined page sizes of 4 KB, 2 MB or 1 GB). For example, main memory 110 may be a 128 GB memory divided into 512 256 MB regions. Region migration cache 120 is a cache level below the directory of probe filter 112 (e.g., a memory side cache), outside a coherence domain. For example, region migration cache 120 is in non-coherence domain 124, between probe filter 112, or other cache coherence mechanism, and main memory 110.

Figure 3:
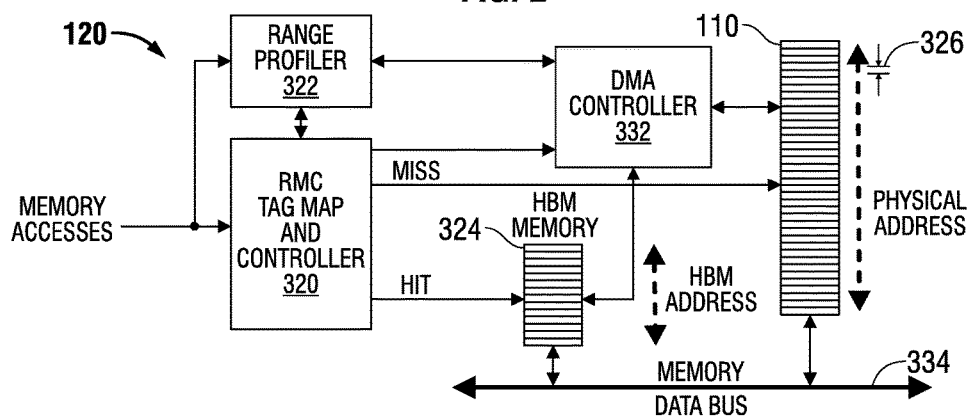
FIG. 3 illustrates a functional block diagram of an exemplary region migration cache consistent with at least one embodiment of the invention.

Referring to FIG. 3, region migration cache 120 may include high-bandwidth memory 324 and region migration cache tag map and controller 320. Range profiler 322 updates access frequency information for a region of main memory associated with the memory access and generates a ranked list of memory address ranges that span the entire memory address space of main memory 110. Region migration cache tag map and controller 320 uses the ranked list to determine allocation and replacement decisions for high-bandwidth memory 324.

Figure 4:
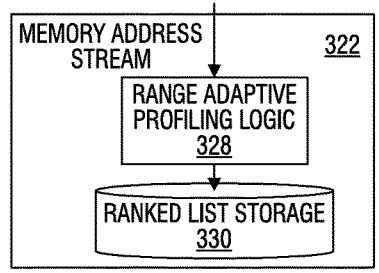
FIG. 4 illustrates a functional block diagram of an exemplary range adaptive profiler consistent with at least one embodiment of the invention.

Referring to FIG. 4, in at least one embodiment range profiler 322 includes range adaptive profiling logic 328 that records in ranked list storage 330, the frequency of accesses to main memory 110 as a ranked list of memory address ranges that span the entire memory address space of main memory 110. A separate ranked list of least frequently accessed regions in high bandwidth memory 324 may also be maintained in ranked list storage 330 or in conjunction with a tag map in region migration cache tag map and controller 320. In at least one embodiment, range profiler 322 implements a streaming one-pass range profiling technique to hierarchically classify memory accesses into precise ranges according to the frequency of their occurrence in the memory access stream. The range profiling technique adapts precision of the ranges to high frequency access regions. The range profiling technique classifies more frequently accessed regions into more precise sub-regions. As range adaptive profiling logic 328 analyzes more memory accesses, range adaptive profiling logic 328 may either split individual sub-regions into further sub-regions or merge together multiple sub-regions to form larger sub-regions due to sparsely occurring memory accesses. The range adaptive profiling technique stores the information gathered from the entire memory access stream in one pass with a relatively small, finite amount of memory. The range adaptive profiling technique generates a profile tree of ranges, which may be stored as a data array in a memory, and each range may have an associated counter, which may be an associated location in the memory. The range adaptive profiling technique may dynamically modify the tree structure as described further below with reference to FIGS. 5-7.

An exemplary range adaptive profiling technique begins with a root node in a range tree that spans the entire address range of main memory. As the associated system streams more memory requests, range adaptive profiling logic 328 determines whether or not to split tree nodes into child nodes by comparing counter values associated with a particular tree node to a predetermined split threshold value. The predetermined split threshold value may be selected according to the range of the input, height of the tree, the number of memory requests processed and/or a user-defined error threshold ε. If a counter value exceeds the predetermined split threshold value, range adaptive profiling logic 328 partitions the tree node into child nodes. Range adaptive profiling logic 328 determines the number of child nodes resulting from the split based on a predetermined branching factor. The higher the predetermined branching factor the more precise the resulting profile. However, increased numbers of child nodes require additional memory overhead. Accordingly, selection of the predetermined branching factor trades off precision of the profile with overhead in the implementation.

Figure 5:
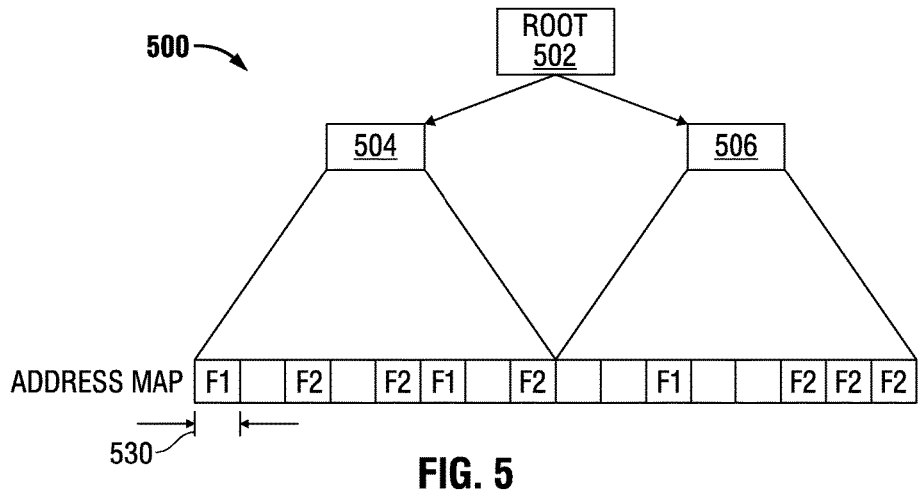
FIG. 5 illustrates a traffic profiler node hierarchy diagram of an exemplary state of a range adaptive profiler consistent with at least one embodiment of the invention.
Figure 6:
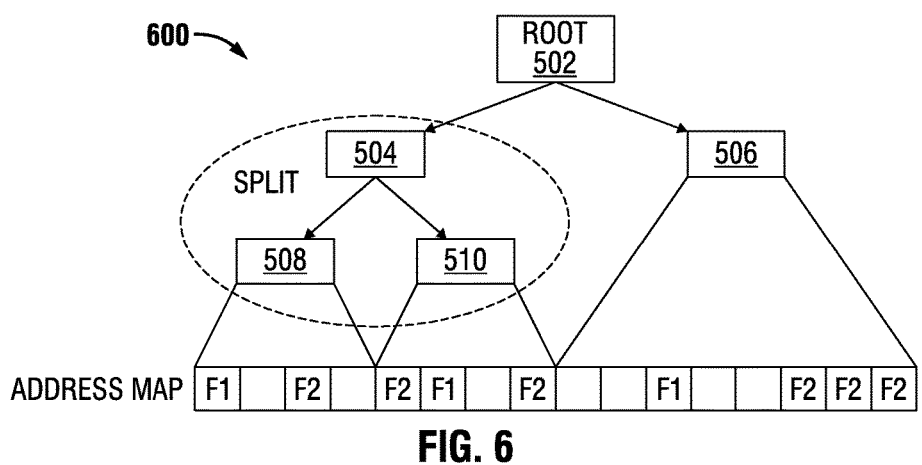
FIG. 6 illustrates a traffic profiler node hierarchy diagram of an exemplary state of a range adaptive profiler after a split operation consistent with at least one embodiment of the invention.
Figure 7:
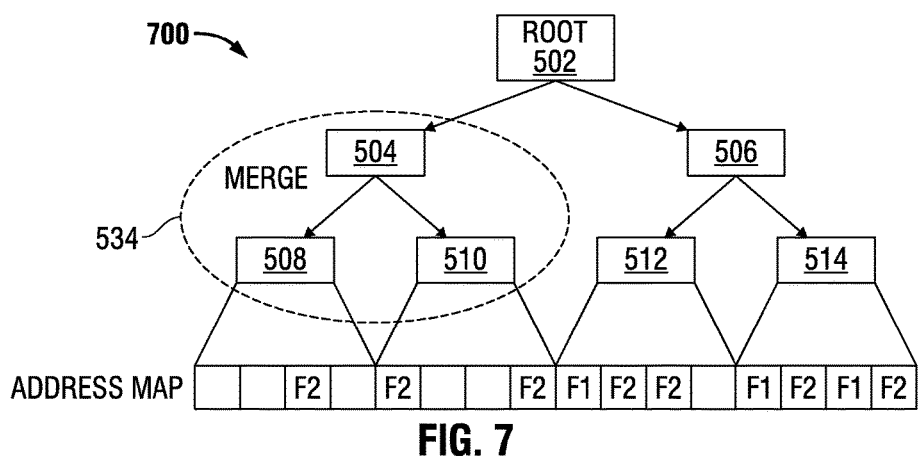
FIG. 7 illustrates a traffic profiler node hierarchy diagram of an exemplary state of a range adaptive profiler prior to a merge operation consistent with at least one embodiment of the invention.

Referring to FIGS. 5, 6, and 7, the address regions labeled F1 have access frequencies of at least F1 and represent high access frequency regions. The address regions labeled F2 have access frequencies of at most F2 and represent low access frequency regions. FIG. 5 illustrates an exemplary range adaptive profiling tree with child nodes 504 and 506 of root node 502. As region migration cache 120 processes the memory access stream, range adaptive profiling logic 328 may perform split operations and merge operations. An exemplary split operation splits high access frequency regions in the address map (e.g., greater than a predetermined split threshold value) into child nodes 508 and 510, as shown in FIG. 6. A predetermined split threshold indicates a maximum access frequency for each node of the range adaptive profiling tree. If the access frequency of an address range associated with a node is greater than the merge threshold value, then range adaptive profiling logic 328 may split the node into multiple nodes. When range adaptive profiling logic 328 splits a node, range adaptive profiling logic 328 splits the address ranges of the range adaptive profiling tree. These new branches maintain a more accurate set of counters for these high access frequency regions.

Range adaptive profiling logic 328 may also merge nodes to limit the number of nodes in the range adaptive profiling tree in response to high access frequency region changing to a low access frequency region (e.g., accesses less than a predetermined merge threshold value). A merge threshold indicates a minimum access frequency for each node of the range adaptive profiling tree. If the access frequency of an address range associated with a node is less than the merge threshold value, range adaptive profiling logic 328 may merge these nodes into their parent node, thereby reducing the need for precise counters for these less important ranges. FIG. 7 illustrates exemplary merge operation 534 that merges child node 508 and child node 510 into node 504, since the corresponding address regions have become low access frequency regions. The resultant counter for node 504 has a value equal to the sum of the counter values of nodes 508 and 510. An exemplary memory traffic profiler using the range adaptive profiling technique may include any suitable number of counters, e.g., 256 counters corresponding to a maximum number of 256 ranges. The range adaptive profiling tree size is related to the workload footprint size, memory access pattern, and error threshold, not underlying memory capacity. Range adaptive profiling logic 328 effectively and efficiently uses counters, which may be implemented using memory locations.

FIG. 8 illustrates an exemplary architecture for a pipelined embodiment of range adaptive profiling logic 328. Memory request buffer 806 receives a stream of memory requests and stores frequency 802 of accesses to the corresponding memory address 804 since it was previously processed by the range profiling engine. Range matcher 810 identifies various memory address ranges that match the memory address in a particular memory request. Arbiter 814 identifies the smallest matching range of those matching ranges, causing counters 818 to update counters for the corresponding ranges. Range splits and range merges cause stalls in the pipeline, e.g., controller 826 prevents pipeline registers 808, 812, 816, and 820 from updating while handling range splits and range merges. Each update to the profile is independent from a previous update, except for actual counter values. Controller 826 must satisfy inter-request dependencies created by range splits and range merges before processing additional memory requests. However, substantially fewer range splits and range merges occur than the number of memory requests, thus relatively few stalls occur and have negligible impact on performance. In response to a merge indicator (e.g., received periodically, but at exponentially decreasing frequency), controller 826 stalls the pipeline while searching the counters for potential ranges to merge. During this time, memory requests may queue up for ten to one hundred cycles, and buffer 806 stores them temporarily for later processing. In the event of a range split, controller 826 flushes the pipeline and resets the pipeline to a state directly prior to where the range split should have occurred. Accordingly, buffer 806 enters those memory requests into the pipeline. In at least one embodiment, buffer 806 pre-processes memory requests and combines memory requests to identical memory locations and associated access frequency information.

For each memory request processed from buffer 806, controller 826 searches for a set of ranges that include the corresponding memory address. This operation may be performed using ternary content-addressable memory cells 810. Ternary content-addressable memory cells 810 set appropriate match lines high for all ranges that match the memory address. In at least one embodiment, each cell includes most significant bits of memory addresses that correspond to a range of memory addresses. The fewer bits stored in the cell, the larger the corresponding range of memory addresses. Likewise, the greater number of bits stored in the cell, the smaller the corresponding range of memory addresses. By sorting the entries of ternary content-addressable memory cells 810 by prefix length, controller 826 may determine the smallest range (e.g., the longest prefix). Note that the profiling technique will not generate matches from two different entries of the same range width. In at least one embodiment, ternary content-addressable memory cells 810 may be pipelined to inspect individual nibbles or individual bytes for each comparison.

After range adaptive profiling logic 328 matches a memory address of a memory request to one or more ranges, range adaptive profiling logic 328 identifies the longest prefix of the matching ranges, which may correspond to the last matching entry of ternary content-addressable memory cells 810 (e.g., the last high match line). If N match lines are stored in order and are sorted by prefix length, N×1 arbiter 814 gives highest priority to the longest match and allows only one match to proceed. The output of the highest priority line triggers a word line of a corresponding counter. Note that although embodiments of range adaptive profiling logic 328 use ternary content-addressable memory cells 810 and a branching factor of b, the resulting tree may be a multi-bit tree using other techniques to build high speed implementations based on other network algorithms.

In response to N×1 arbiter 814 identifying the smallest range match, controller 826 updates the appropriate counter of counters 818. In at least one embodiment, counters 818 include one read port and one write port, which are sufficient to handle a continuous stream of memory requests to the array. A split handling stage compares the result of the updated counter with a split threshold using comparator 824. If the counter exceeds the split threshold, controller 826 expands the node to have multiple children (e.g., four children where branching factor b=4), each of the children having a counter initialized to a zero count. Range split and range merge thresholds are stored in separate storage elements, although they may have the same value, and may be recomputed in response to a change in number of events n. Range adaptive profiling logic 328 may perform that computation in parallel with other operations since it depends only on number of events n and some predetermined values. If range adaptive profiling logic 328 causes a range split, then range adaptive profiling logic 328 may need to flush the pipeline to properly account for new nodes in the tree.

In at least one embodiment of range adaptive profiling logic 328, a split requires range adaptive profiling logic 328 to create new entries in ternary content-addressable memory cells 810 and associated memory data array. Controller 826 generates new children nodes and inserts corresponding identifiers into ternary content-addressable memory cells 810 with the ranges set appropriately, each covering a portion of the parent range. Controller 826 inserts corresponding entries into memory storing the counter and other information of the newly created nodes. A split node may be either a leaf node or a parent node. If the node is a leaf node, then the range split operation includes setting a pointer from the parent to the newly created children. If the node is already a parent node, but its children do not cover the entire range of the parent (e.g., after an internal merge), then the split also includes an additional operation that identifies the new parent of the existing children and setting the children pointers.

Controller 826 may handle merge operations individually or in batches. Controller 826 may periodically initiate batch merges. In each batch of merges, controller 826 scans ternary content-addressable memory cells 810 to identify candidate nodes for merger and deletes corresponding data array entries in memory. Recursive operation prunes the range adaptive profile tree to provide compacted profile information. Although the required memory size for the range adaptive providing tree may be determined experimentally, it is bounded. Note that less locality requires less memory in general. A predetermined split threshold may have a value that causes a node to split into sub-ranges as soon as the node counts memory accesses to an associated range greater than a proportion of total memory accesses. Similarly, a merge may not merge ranges that have high enough access frequencies to justify precise profiling. Thus, the range adaptive profiling technique may ensure profiling with small ranges.

Referring back to FIG. 3, in at least one embodiment of region migration cache 120, each region in main memory 110 may be written to any of the regions in high-bandwidth memory 324, i.e., high-bandwidth memory 324 is fully associative. An exemplary high bandwidth memory is four to eight times faster than main memory 110 and the dynamic power consumption per memory access is substantially less than power consumption of main memory 110. In at least one embodiment, high-bandwidth memory 324 includes a high-bandwidth die-stacked DRAM, although other suitable high-bandwidth memories may be used. Each region of high bandwidth memory 324 has an identifying tag stored in a corresponding tag location. To determine whether contents of a particular region of main memory 110 actually resides in high-bandwidth memory 324, region migration cache tag map and controller 320 searches all tags for high-bandwidth memory 324 using a portion of the physical address corresponding to the region. Hit logic in region migration cache tag map and controller 320 compares tag bits of the memory address of a memory request to tag bits associated with the stored data in the high bandwidth memory 324 to determine whether high bandwidth memory 324 includes contents of the target memory location and generates an indication of that comparison (i.e., indicating a hit or a miss).

In response to a typical memory access, region migration cache 120 searches for a corresponding address in the region migration cache tag storage elements. The look up may result in a hit or a miss. In response to a hit, region migration cache 120 uses the high bandwidth memory address to access high bandwidth memory 324. In response to a miss in region migration cache tag storage elements, region migration cache 120 uses the physical address to access main memory 110.

If the search results in a hit and the memory access is a read, high bandwidth memory 324 provides a corresponding addressable unit of the region to memory data bus 334. If the search results in a hit and the memory access is a write, region migration cache tag map and controller 320 writes data to the corresponding region of high bandwidth memory 324 and range profiler 322 updates access information for a region of main memory associated with the memory access. If the associative search results in a miss, unlike conventional cache techniques, region migration cache tag map and controller 320 bypasses high bandwidth memory 324, and completes the access using main memory 110, and does not update high bandwidth memory 324. However, range profiler 322 updates access information for the region of main memory associated with the memory access.

Still referring to FIG. 3, rather than update high bandwidth memory 324 in response to a particular memory access, updates to high bandwidth memory 324 occur periodically in the background to regular memory operations. For example, region migration cache tag map and controller 320 periodically triggers direct memory access controller 332 to transfer data between main memory 110 and high bandwidth memory 324. Range profiler 322 provides address information for the range of physical memory address locations to be transferred between main memory 110 and high bandwidth memory 324.

In response to a system reset, high bandwidth memory 324 may be initialized to contain no valid data (e.g., initialized to an empty state) and after system operation for a predetermined period of time, range profiler 322 identifies one or more most frequently accessed regions of main memory 110 for allocation to high bandwidth memory 324. In other embodiments, upon system reset, high bandwidth memory 324 is initialized to contain valid data (e.g., initialized to a non-empty state) transferred by direct memory access of predetermined ranges of memory that corresponding to initial data values preloaded from non-volatile memory during a BIOS, reset routine, or other suitable technique.

In steady-state operation of system 100, range profiler 322, alone or in combination with region migration cache tag map and controller 320, continues to observe memory accesses and periodically identifies most frequently accessed regions in main memory 110 and least frequently accessed regions in high bandwidth memory 324. During steady-state operation, high bandwidth memory 324 has no empty regions and a periodic region migration includes at least a deallocation operation and an allocation operation. The deallocation operation includes deallocating an existing entry of high bandwidth memory 324 and a corresponding entry in a region migration cache tag map. Deallocation may include inspecting a state of a region identified for deallocation. If the region has a dirty state, the deallocation operation includes triggering direct memory access controller 332 to transfer recent data from high bandwidth memory 324 to main memory 110 and clears a corresponding tag map entry. In at least one embodiment, main memory 110 includes non-volatile persistent memory (e.g., flash memory, phase change memory, or torque transfer memory) and region migration cache tag map and controller 320 implements a write back policy that includes writing back to main memory 110 only those dirty elements of a region of the non-volatile persistent memory.

The deallocation direct memory access transfer may take a substantial amount of time (e.g., approximately 8 ms to transfer a 256 MB region using $4^{th}$ generation transfer protocol for double data rate (DDR4) memory) and may impact regular memory accesses. In response to a regular read memory access during the direct memory access transfer, a hit of high bandwidth memory 324 results in a read of the corresponding data resident in high bandwidth memory 324 without waiting for completion of the deallocation direct memory access transfer. In response to a regular write memory access during the deallocation direct memory access transfer, region migration cache tag map and controller 320 may pause and wait for the direct memory access transfer to complete before servicing the write request, to guarantee consistency of the data in main memory 110 with data in high bandwidth memory 324. In another embodiment, in response to a regular write memory access during a deallocation direct memory access transfer, region migration cache tag map and controller 320 pauses the direct memory access transfer and then writes corresponding locations in high bandwidth memory 324 and main memory 110 to guarantee consistency of data in main memory with data in high bandwidth memory 324. After writing both locations, region migration cache tag map and controller 320 triggers the direct memory access transfer to resume. If the region has a clean state, the deallocation operation need not update main memory 110, performs no direct memory access transfer, and clears a corresponding tag map entry. Once the direct memory access transfer completes, subsequent read and write memory accesses to the deallocated region occur using accesses to main memory 110, and not high bandwidth memory 324.

The allocation operation of the periodic migration may include creating a tag map entry in the region migration cache tag map and triggering direct memory access controller 332 to transfer data from main memory 110 to high bandwidth memory 324. The allocation direct memory access transfer may take a substantial amount of time (e.g., approximately 8 ms to transfer a 256 MB region using two channels DDR4 memory with 80% efficiency) and may impact regular memory accesses. In response to a regular read memory access during the allocation direct memory access transfer, region migration tag map and controller 320 or other suitable memory controller logic reads the corresponding data from main memory 110 without waiting for completion of the direct memory access transfer of the allocation operation. In response to a regular write memory access during the allocation direct memory access transfer, region migration cache tag map and control 320 may pause the memory access and wait for the direct memory access transfer to complete before servicing the write request to guarantee that the data in main memory 110 is consistent with the data in high bandwidth memory 324. In another embodiment, in response to a regular write memory access during the direct memory access transfer of an allocation operation, region migration cache tag map and controller 320 pauses the direct memory access transfer and then writes corresponding locations in high bandwidth memory 324 and main memory 110 to guarantee that the data in main memory 110 is consistent with the data in high bandwidth memory 324. After writing both locations, region migration cache tag map and controller 320 triggers the direct memory access transfer of the allocation operation to resume. Once the direct memory access transfer completes, subsequent read and write memory accesses to the allocated region occur with high bandwidth memory 324, and not main memory 110.

Referring to FIG. 9, in at least one embodiment, region migration tag map and controller 320 includes an entry 900 that combines physical address 904 (which is the region migration cache tag), state 902 (which indicates whether the associated data in high bandwidth memory 324 is clean, dirty, or an invalid entry), and high bandwidth memory address 906 (which is a pointer to high bandwidth memory 324). In at least one embodiment, the region migration cache tag storage elements are included in a content addressable memory. A hit occurs when the physical address of the memory access matches the physical address 904 of an entry in region migration tag map and controller 320. In an exemplary embodiment, main memory 110 includes 128 GB of memory capacity and 256 MB regions, thus, physical address field 904 is 9 bits wide and high bandwidth memory address 906 is four bits wide.

Referring back to FIG. 3, region migration cache 120 exploits workloads that result in sparse memory usage to improve performance of memory systems for bandwidth constrained workloads. The technique reduces power consumption of the system when a substantial amount of the memory traffic is serviced using region migration cache 120. The region migration cache technique does not require software support. Unlike software managed page caches, the region migration cache technique may operate with various types of memory managed by a hypervisor or operating system including unmapped page cache (e.g., cached disk contents), page mapped to processes (e.g., text segments, memory mapped files), anonymous pages (e.g., stack or heap), dirty or write back pages (e.g., disk I/O), unevictable pages (e.g., memory lock), kernel, driver and unreclaimable slab memory.

Referring back to FIG. 1, in at least one embodiment, system 100 exposes the profile data structure stored in each region migration cache 120 to an operating system, hypervisor, or other software, executing on one or more processors of node 0, node 1, node 2, and node 3. The software may improve data placement in the main memory, which is distributed across node 0, node 1, node 2, and node 3. For example, a conventional operating system has a view of memory traffic at the source (e.g., input to L1 caches) and does not have information regarding processor cache hierarchy when determining which pages to migrate (e.g., a page resident in the L2 or L3 cache should not be migrated). However, if the profiling data is available to the software, the software may determine page migration decisions based on a traffic profile at each memory controller 123 of each node. The regions of data would be continuously updated and ranked according to access frequency. The operating system may receive a ranked list of the most frequently accessed regions of each node to migrate into memory on other nodes.

Further, operating system or other software executing on system 100 may use the ranked list of ranges of memory addresses to make better informed non-uniform memory access page placement decisions. Range profiler 322 of each node maintains a running count of memory accesses to a region of main memory in ranked list storage 330. In addition to maintaining the total frequency of memory accesses to particular regions of main memory 110, each range profiler 322 maintains a corresponding count vector 1002 indexed by requesting node for each memory address range. Vector count 1002 is maintained in tandem with changes to the total frequency of memory accesses $F_{TOTAL}$, for each memory address range. For example, referring to FIGS. 1 and 10, when node 0 receives an access to main memory 110 from node 1, range profiler 322 on node 0 increments the total frequency of memory accesses $F_{TOTAL}$ and also increments element F1, which corresponds to node 1, of count vector 1002.

In at least one embodiment, ranked list storage 330 is exposed (e.g., by using memory-mapped addressing, a software driver, and/or other technique that makes the contents of ranked list storage 330 accessible) to the software that may use the information to adjust non-uniform memory access placement of pages accessed with high frequency (e.g., placed local to a node accessing the region with high frequency) and are not shared with other nodes or are accessed with low frequency by other nodes. The software may migrate those pages from a node that accesses the page with low frequency or zero frequency to the node that accesses the page with greatest frequency to make the page local to the node that accesses it most, thereby reducing memory access latency of system 100.

In at least one embodiment of system 100, the profiling hardware identifies false sharing of pages of memory having high access frequencies, i.e., the page is shared but regions within the page are accessed by only one node and other regions of the page are accessed by other nodes. A corresponding count vector indicates whether regions accessed with high frequency are shared by multiple nodes.

In at least one embodiment of system 100, the software adjusts the precision of the range profiling technique to increase the granularity of the memory access information for a particular region, e.g., by configuring the profiler to limit the range of memory addresses that is profiled and to only profile memory requests to one or more high access frequency regions that span less than the entire memory address space. Accordingly, the software may identify shared memory sub-regions that are not actually shared. Any non-shared sub-regions in the shared memory region may be selected for migration to make those sub-regions local to the node that accesses them with high frequency, thereby reducing memory latency of system 100. Software executing on system 100 may periodically analyze ranked list storage 330 from each node to select regions for migration based on other criteria that may improve memory performance at a system level. For example, a shared memory sub-region may be located on a least busy node of a set of nodes that share the region. Shared regions may be relocated to a home node to reduce overall distance to the home node from a set of nodes that share the region. Thus various embodiments of a region migration cache and a non-uniform memory access processing system have been described. Structures described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which a particular range adaptive profiling technique is used, one of skill in the art will appreciate that the teachings herein can be utilized with other techniques for memory address range profiling. In addition, while the invention has been described in embodiments in which a high bandwidth memory is included in the region migration cache, one of skill in the art will appreciate that the teachings herein can be utilized with other memory circuits that store regions of data migrated from main memory (e.g., random access memory (RAM), static RAM, dynamic RAM, flash memory, NVDIMM, or other suitable storage circuits). Further, while the invention has been described in an embodiment in which the region migration cache is implemented as part of a memory controller in a server system on a chip, a region migration cache consistent with the teachings herein can be associated with the main memory (e.g., DRAM, NVRAM, or DIMM) and may be implemented entirely on a DIMM. Variations and modifications of the embodiments disclosed herein, may be made based on the description set forth herein, without departing from the scope of the invention as set forth in the following claims.

What is claimed is:

1. A method comprising:
profiling a stream of memory accesses to generate an access frequency ranked list of address ranges of main memory and corresponding access frequencies based on memory addresses in the stream of memory accesses;
periodically migrating to a region migration cache, contents of a selected region of main memory selected based on the access frequency ranked list, the region migration cache being coupled outside a coherence domain of a processor associated with the stream of memory accesses, and the region migration cache being coupled between a cache coherence mechanism of a node and the main memory;
storing at least one memory address range corresponding to the contents of the region migration cache in a tag map; and
maintaining consistency of migrated contents of the region migration cache with the contents of the selected region of main memory using the tag map.

2. The method, as recited in claim 1, wherein an address range of the selected region of main memory has a highest access frequency in the access frequency ranked list and replaces a second region in the region migration cache having a second address range having a lowest access frequency in the access frequency ranked list.

3. The method, as recited in claim 1, wherein profiling comprises:
range adaptive profiling of the memory addresses in the stream of memory accesses based on a merge threshold and a split threshold, the merge threshold indicating a minimum access frequency for each address range of the access frequency ranked list, and the split threshold indicating a maximum access frequency for each address range of the access frequency ranked list.

4. The method, as recited in claim 1, wherein the periodically migrating occurs as a background operation and not in response to a particular memory access.

5. The method, as recited in claim 1, further comprising:
accessing the region migration cache in response to a hit of a memory request in the region migration cache; and
accessing main memory in response to a miss of the memory request in the region migration cache.

6. The method, as recited in claim 5, further comprising:
comparing a memory address of a memory request to each memory address range in the tag map to determine whether or not contents of memory associated with the memory address are present in the region migration cache.

7. The method, as recited in claim 1, further comprising:
receiving the stream of memory accesses by a non-coherence domain of the node from the coherence domain of the node, the region migration cache being in the non-coherence domain of the node.

8. The method, as recited in claim 1, wherein the cache coherence mechanism is a probe filter coupled to at least one processor of the node, each processor of the at least one processor comprising a corresponding cache memory.

9. The method, as recited in claim 1, wherein maintaining consistency comprises:
inspecting a state of an entry of the tag map corresponding to a second region of main memory identified for deallocation from the region migration cache; and
triggering a transfer of data from the region migration cache to the second region of main memory according to the state of the entry of the tag map.

10. A method comprising:
profiling a stream of memory accesses to generate an access frequency ranked list of address ranges of main memory and corresponding access frequencies based on memory addresses in the stream of memory accesses;
periodically migrating to a region migration cache, contents of a selected region of main memory selected based on the access frequency ranked list; and
storing at least one memory address range corresponding to the contents of the region migration cache in a tag map,
wherein periodically migrating comprises allocating the selected region of main memory to the region migration cache based on a corresponding access frequency in the access frequency ranked list, the allocating comprising:
creating a tag map entry including a range corresponding to the selected region;
transferring data from the selected region of main memory to the region migration cache using direct memory access; and
while transferring the data,
servicing any write memory accesses to the selected region using the region migration cache and the main memory; and
servicing any read memory accesses to the selected region using the main memory.

11. The method, as recited in claim 10, wherein the periodically migrating further comprises deallocating a second region of main memory from the region migration cache prior to allocating the selected region, the deallocating being based on a corresponding access frequency in the access frequency ranked list.

12. The method, as recited in claim 11, wherein the deallocating comprises:
clearing the tag map entry including a second range corresponding to the second region;
transferring second data from the region migration cache to the second region of main memory using direct memory access in response to a dirty second region state; and
while transferring the second data,
servicing any write memory accesses to the second region using the region migration cache and the main memory; and
servicing any read memory accesses to the second region using the region migration cache.

13. The method, as recited in claim 10, further comprising:
receiving the stream of memory accesses by a non-coherence domain of a node of a non-uniform memory access processing system from a coherence domain of the node, the region migration cache being in the non-coherence domain of the node.

14. The method, as recited in claim 10, wherein the region migration cache is coupled between a cache coherence mechanism of a node of a non-uniform memory access processing system and a portion of the main memory included in the node.

15. The method, as recited in claim 14, wherein the cache coherence mechanism is a probe filter coupled to at least one processor of the node, each processor of the at least one processor comprising a corresponding cache memory.

16. An apparatus comprising:
a memory access profiler configured to generate an access frequency ranked list of address ranges of main memory and corresponding access frequencies based on memory addresses in a stream of memory requests;
a region migration cache coupled outside a coherence domain of a processor associated with the stream of memory requests, the region migration cache being coupled between a cache coherence mechanism including a cache directory of a node and the main memory, the region migration cache having a first access time faster than a second access time of the main memory, contents of a region of main memory being allocated to a region of the region migration cache based on the access frequency ranked list; and
a tag map configured to store indicators of the region of main memory and a status of a corresponding entry of the region migration cache, the tag map being used to maintain consistency of allocated contents of the region of the region migration cache with the contents of the region of main memory.

17. The apparatus, as recited in claim 16, wherein the region migration cache is coupled between a last-level cache of the processor and the main memory.

18. The apparatus, as recited in claim 16, further comprising:
a controller configured to periodically initiate transfer of contents of a region of the main memory between the main memory and the region migration cache independent of a particular memory access.

19. The apparatus, as recited in claim 18, wherein the transfer includes transferring contents of a region of main memory that has a highest access frequency in the access frequency ranked list to replace contents of a second region in the region migration cache having a lowest access frequency in the access frequency ranked list.

20. The apparatus, as recited in claim 16, wherein the region migration cache includes a high bandwidth memory, the high bandwidth memory having a speed at least four times faster than the main memory.

21. The apparatus, as recited in claim 16, wherein the main memory includes non-volatile persistent memory and the region migration cache uses a write back policy that writes only elements that are changed to the non-volatile persistent memory.

22. The apparatus, as recited in claim 16, wherein the region migration cache is fully associative.

23. The apparatus, as recited in claim 16, further comprising:
a controller configured to maintain consistency of contents migrated to the region migration cache with the contents of the region of main memory, the controller being configured to inspect a state of an entry of the tag map corresponding to a second region of main memory identified for deallocation from the region migration cache and to trigger a transfer of data from the region migration cache to the second region of main memory according to the state of the entry of the tag map.

24. The apparatus, as recited in claim 16, wherein the region migration cache is coupled between a cache coherence mechanism of a node of a non-uniform memory access processing system and a portion of the main memory included in the node.

25. An apparatus comprising:
a memory access profiler configured to generate an access frequency ranked list of address ranges of main memory and corresponding access frequencies based on memory addresses in a stream of memory requests;
a region migration cache having a first access time faster than a second access time of the main memory, contents of a selected region of main memory being allocated to a region of the region migration cache based on the access frequency ranked list;
a tag map configured to store indicators of the selected region of main memory and a status of a corresponding entry of the region migration cache; and
a controller configured to periodically initiate transfer of contents of the selected region between main memory and the region migration cache independent of a particular memory access,
wherein the transfer includes allocation of the contents of the selected region of main memory to the region migration cache based on a corresponding access frequency in the access frequency ranked list, the controller being further configured to:
create a tag map entry including an address range corresponding to the selected region;
transfer data from the selected region of main memory to the region migration cache using a direct memory access; and
service any write memory accesses to the selected region using the region migration cache and the main memory during the transfer; and
service any read memory accesses to the selected region using the main memory during the transfer.

26. The apparatus, as recited in claim 25, wherein the controller is further configured to deallocate a second region of main memory from the region migration cache prior to allocation of the selected region based on a corresponding access frequency in the access frequency ranked list.

27. The apparatus, as recited in claim 26, wherein the controller is further configured to:
clear the tag map entry including a second range corresponding to the second region;
initiate transfer of second data from the region migration cache to the second region of main memory using direct memory access in response to a dirty second region state;
service any write memory accesses to the second region using the region migration cache and the main memory while transferring the second data; and
service any read memory accesses to the second region using the region migration cache while transferring the second data.

28. The apparatus, as recited in claim 25, wherein the region migration cache is coupled outside a coherence domain of a processor associated with the stream of memory requests.

29. The apparatus, as recited in claim 28,
wherein the region migration cache is coupled between a cache coherence mechanism of a node of a non-uniform memory access processing system and a portion of the main memory included in the node, and
wherein the cache coherence mechanism is a probe filter coupled to at least one processor of the node, each processor of the at least one processor comprising a corresponding cache memory.

* * * * *